(12) United States Patent
Gueugneau et al.

(10) Patent No.: US 11,628,640 B2
(45) Date of Patent: *Apr. 18, 2023

(54) MOLDING ELEMENT FOR MANUFACTURING A NOISE REDUCING TREAD

(71) Applicant: Compagnie Generale Des Etablissements Michelin, Clermont-Ferrand (FR)

(72) Inventors: Anthony Gueugneau, Tokyo (JP); Khotchakorn Pengsaloong, Tokyo (JP); Gael Roty, Tokyo (JP); Xavier Marduel, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 636 days.

This patent is subject to a terminal disclaimer.

(21) Appl. No.: 16/305,520

(22) PCT Filed: May 31, 2016

(86) PCT No.: PCT/JP2016/066706
§ 371 (c)(1),
(2) Date: Nov. 29, 2018

(87) PCT Pub. No.: WO2017/208464
PCT Pub. Date: Dec. 7, 2017

(65) Prior Publication Data
US 2020/0391460 A1 Dec. 17, 2020

(51) Int. Cl.
*B60C 11/13* (2006.01)
*B29D 30/06* (2006.01)

(52) U.S. Cl.
CPC ...... *B29D 30/0606* (2013.01); *B60C 11/1307* (2013.01); *B60C 11/1353* (2013.01);
(Continued)

(58) Field of Classification Search
CPC ........ B29D 30/0606; B29D 2030/0612; B29D 30/06; B60C 11/1307; B60C 11/1353;
(Continued)

(56) References Cited

U.S. PATENT DOCUMENTS 6,119,744 A * 9/2000 Tsukagoshi ............. B60C 11/13
152/209.19
8,506,275 B2 * 8/2013 Villeneuve .............. B29C 33/10
425/28.1
(Continued)

FOREIGN PATENT DOCUMENTS

FR 2946915 A1 12/2010
FR 2986736 A1 8/2013
(Continued)

OTHER PUBLICATIONS

Int'l Search Report for PCT/JP2016/066706, dated Jul. 19, 2016.

*Primary Examiner* — Galen H Hauth
*Assistant Examiner* — Shibin Liang
(74) *Attorney, Agent, or Firm* — Dickinson Wright PLLC; Steven C. Hurles (57) ABSTRACT

The molding element has a plurality of contacting element delimited by grooves, the molding element having a molding surface for forming a contact face of the contacting element intended to come into contact with ground during rolling and a groove forming rib portion for forming the groove comprising two opposed rib side faces for forming two opposed groove side faces and a rib top face connecting two rib side faces for forming a groove bottom, the groove forming rib portion providing a space opening to at least one of the rib side faces and/or to the rib top face and an insert being received in the space for forming a portion of the groove and a closing device in the groove, the insert comprises at least one notched plate of thickness t1, the
(Continued)

notched plate includes at least one notch for forming a flexible fence of the closing device.

8 Claims, 6 Drawing Sheets

(52) U.S. Cl.
CPC ............... *B29D 2030/0612* (2013.01); *B60C 2011/1338* (2013.01); *B60C 2011/1361* (2013.01)

(58) Field of Classification Search
CPC ..... B60C 2011/1338; B60C 2011/1361; B60C 11/13; B60C 19/00; B60C 11/03; B60C 11/04; B29C 33/42; B29C 33/10
See application file for complete search history.

(56) References Cited

U.S. PATENT DOCUMENTS 9,108,375 B2 * 8/2015 Roty ..................... B60C 11/042
9,688,039 B2    6/2017 Pialot, Jr.

FOREIGN PATENT DOCUMENTS

| JP | H11-105511 | A1 | 4/1999 |
| JP | 2010-52699 | A | 3/2010 |
| WO | 2013-120783 | A1 | 8/2013 |
| WO | 2013-178473 | A1 | 12/2013 |

* cited by examiner

MOLDING ELEMENT FOR MANUFACTURING A NOISE REDUCING TREAD

CROSS-REFERENCE TO RELATED APPLICATION

The present application claims priority to PCT International Patent Application Serial No. PCT/JP2016/0667706, filed May 31, 2016, entitled "MOLDING ELEMENT FOR MANUFACTURING A NOISE REDUCING TREAD".

BACKGROUND OF THE INVENTION

1. Field of the Invention

The present invention relates to a molding element, in particular to a molding element for a mold used for manufacturing a tread for a tire having a closing device in a groove.

2. Related Art

A groove resonance is generated by occurrence of resonance in an air column defined between a groove in a tread and a road surface in contact with the tire. The frequency of this groove resonance is dependent on a length of the air column formed between groove and the road surface in the contact patch.

This groove resonance has a consequence in an interior noise and an exterior noise on a vehicle equipping such tires, a frequency of which interior and exterior noise is often at around 1 kHz where human ear is sensitive.

In order to reduce such groove resonance, it is known to provide a plurality of closing device in the form of a thin flexible fence made of rubber-based material in each groove. It is effective that each flexible fence covers all or at least major part of the sectional area in the groove. Each flexible fence can extend from a groove bottom, or from at least one of a groove sidewall delimiting such groove. Because being relatively thin, each flexible fence has to bend for opening the groove section to flow water on the road surface, in particular on the wet road.

Thanks to such flexible fences, the length of the air column is reduced so as to be shorter than the total length of groove in a contact patch, which leads to change the frequency of groove resonance. This change of resonance frequency makes the sound generated by the groove resonance less sensitive to human ear.

For preserving function of drainage, in case of driving in rainy weather, it is necessary for such flexible fence to bend in a suitable way under the action of the pressure of water for opening the section of the groove. Several solutions have been proposed using this type of closing device to reduce groove resonance of the groove.

WO2013/178473A1 discloses, in FIG. 4, a method for manufacturing a tread for a tire provided with at least one flexible wall (closing device) in a groove, the method comprising steps of molding the tread with a groove and at least one connecting element arranged inside the groove transversely so as to connect sidewalls of the groove, and cutting the connecting element at the junction with each the sidewall of the groove. However with such method, productivity of such tread is low, as the method requires additional process of cutting the connecting element after molding.

WO2013/120783A1 discloses, in FIG. 3, a mold for molding a tread for a tire provided with at least one closing device, the mold comprising two cavities for the flexible fence separated by a first element.

The mold having the above cavities for the flexible fence has been manufactured through milling and/or casting process.

However, since milling and casting processes are complicated, the productivity of such molding element is low. Therefore, there is a need to improve productivity of the molding element for molding the tread provided with the flexible fence of the closing device.

In addition, since it is difficult to form cavities with precise dimension through milling and/or casting process, it has been difficult to obtain a tread having a flexible fence with precise thickness so to obtain required bending by hydrodynamic pressure for liquid drainage.

Therefore, there is a need for a molding element which can mold a flexible fence with precise thickness such that the molded flexible fence can appropriately bend by hydrodynamic pressure for liquid drainage.

Definitions:

A "tire" means all types of elastic tire whether or not subjected to an internal pressure.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "groove" is a space between two rubber faces/sidewalls which do not contact between themselves under usual rolling condition connected by another rubber face/bottom. A groove has a width and a depth.

SUMMARY OF THE INVENTION

It is thus an object of the disclosure to provide a molding element for a mold used for manufacturing a tread of a tire, such molding element can improve productivity for manufacturing a tread provided with a closing device in a groove while ensuring having precise thickness of the flexible fence of the closing device.

The present disclosure provide a molding element for a mold used for manufacturing a tread of a tire having a plurality of contacting element delimited by a plurality of grooves, the molding element having a molding surface for forming a contact face of the contacting element intended to come into contact with ground during rolling and a groove forming rib portion for forming the groove comprising two opposed rib side faces for forming two opposed groove side faces and a rib top face connecting two rib side faces for forming a groove bottom, the groove forming rib portion providing a space opening to at least one of the rib side faces and/or to the rib top face and an insert being received in the space for forming a portion of the groove and a closing device in the groove, the insert comprises at least one notched plate of thickness t1, the notched plate includes at least one notch for forming a flexible fence of the closing device.

This arrangement improves productivity of a tread provided with a plurality of flexible fence of a closing device in a groove while ensuring to have precise thickness of the closing device.

Since the insert comprises at least one notched plate that is easier to form a shape necessary for forming a portion of the groove of the tread and the flexible fence of the closing device, processing duration for manufacturing such the insert decreases resulting improvement on productivity of the molding element for manufacturing a tread provided with the plurality of flexible fence of the closing device in the groove.

Since the notched plate for flexible fence in the insert can be easily prepared so as to precisely have a predetermined thickness, it is possible to form the plurality of flexible fence of the closing device with accurate thickness to permit required bending of the flexible fence of the closing device for liquid drainage.

Since the insert comprises at least one notched plate of thickness t1 including at least one notch for forming the flexible fence of the closing device, it is possible to increase degree of freedom to design and to position the flexible fence of the closing device.

In another preferred embodiment, the notched plate includes one notch opening to the rib top face.

According to this arrangement, it is possible to manufacture a tread provided with the flexible fence of the closing device in the groove extending from the groove bottom with more accurate thickness to permit required bending of the flexible fence of the closing device for liquid drainage.

In another preferred embodiment, the notched plate includes at least one notch opening to at least one of the rib side face.

According to this arrangement, it is possible to manufacture a tread provided with the flexible fence of the closing device in the groove extending from at least one of the groove sidewall with more accurate thickness to permit required bending of the flexible fence of the closing device for liquid drainage.

In another preferred embodiment, the notched plate includes two notches each opening to different rib side faces, respectively.

According to this arrangement, it is possible to manufacture a tread provided with the flexible fences of the closing device in the groove each extending from the two opposed groove sidewalls with more accurate thickness to permit required bending of the flexible fence of the closing device for liquid drainage.

In another preferred embodiment, the notched plate includes three notches, one opening to the rib top face and two other each opening to different rib side faces, respectively.

According to this arrangement, it is possible to manufacture a tread provided with the flexible fences of the closing device in the groove one extending from the groove bottom and two other each extending from the two opposed groove sidewalls with more accurate thickness to permit required bending of the flexible fence of the closing device for liquid drainage while effectively covering as broader cross sectional area of the groove as possible and maintaining good productivity of the tread with the flexible fences as closing device, as the sectional area covered by each flexible fence can be reduced, and to have higher flexibility of an arrangement of the flexible fences.

In another preferred embodiment, the insert further comprises at least one support plate of thickness t2 without any notch placed adjacent to the notched plate.

According to this arrangement, it is possible to adjust easily the thickness of the insert for compensating the thickness of the space while ensuring precise thickness of the flexible fence of the closing device.

In another preferred embodiment, the thickness t1 of the notched plate and the thickness t2 of the support plate are both at most equal to 2.0 mm.

If these thicknesses t1 of the notched plate and/or the thickness t2 of the support plate are more than 2.0 mm, the closing device molded by the molding element would be too thick to bend with hydrodynamic pressure for liquid drainage as these thicknesses will substantially be equal to the thickness of the flexible fence of the closing device. These thicknesses may be the same between t1 and t2, may be different between t1 and t2.

These thicknesses, the thickness t1 of the notched plate and the thickness t2 of the support plate are preferably at most equal to 0.8 mm, more preferably at most equal to 0.7 mm and still more preferably at least equal to 0.02 mm and at most equal to 0.6 mm.

In case plural notched plates are provided in one single insert, the thickness t1 of each the notched plate may vary. In case plural support plates are provided in one single insert, the thickness t2 of each the support plate may vary.

In another preferred embodiment, the notched plate is placed between the support plates.

According to this arrangement, it is possible to adjust easily the thickness of the insert for compensating the thickness of the space while ensuring precise thickness of the flexible fence of the closing device.

BRIEF DESCRIPTION OF THE DRAWINGS

Other characteristics and advantages of the disclosure arise from the description made hereafter in reference to the annexed drawings which show, as nonrestrictive examples, the embodiments of the disclosure.

In these drawings.

DETAILED DESCRIPTION OF THE INVENTION

Preferred embodiments of the present disclosure will be described below referring to the drawings.

A molding element 1 for a mold used for manufacturing a tread 101 of a tire, a mold comprising the molding element 1, and a tread 101 molded and vulcanized using the mold according to an embodiment of the present disclosure will be described referring to FIGS. 1 to 6.

Figure 1:
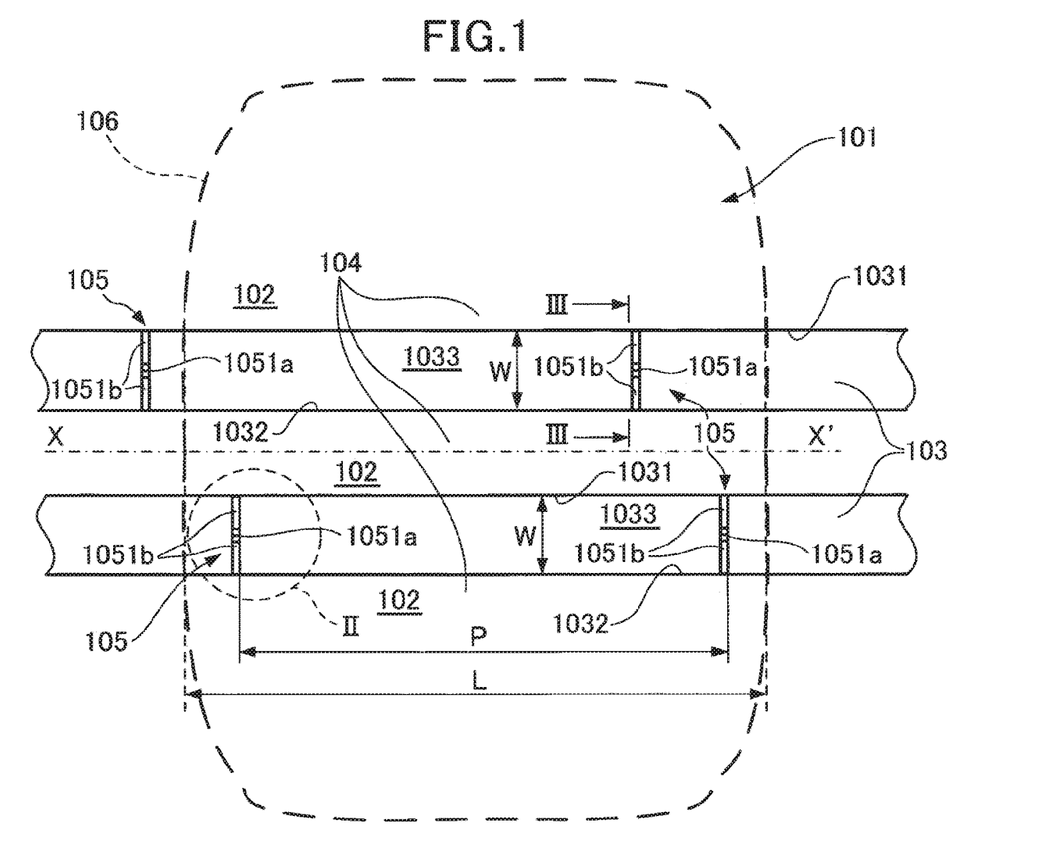
FIG. 1 is a schematic plan view of a tread for a tire molded with a mold comprising a molding element according to first embodiment of the present disclosure.
Figure 2:
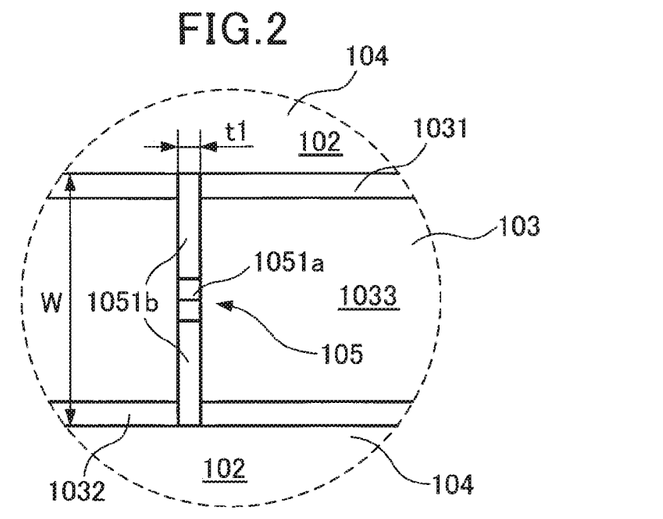
FIG. 2 is an enlarged schematic plan view showing a portion indicated as II in FIG. 1.
Figure 3:
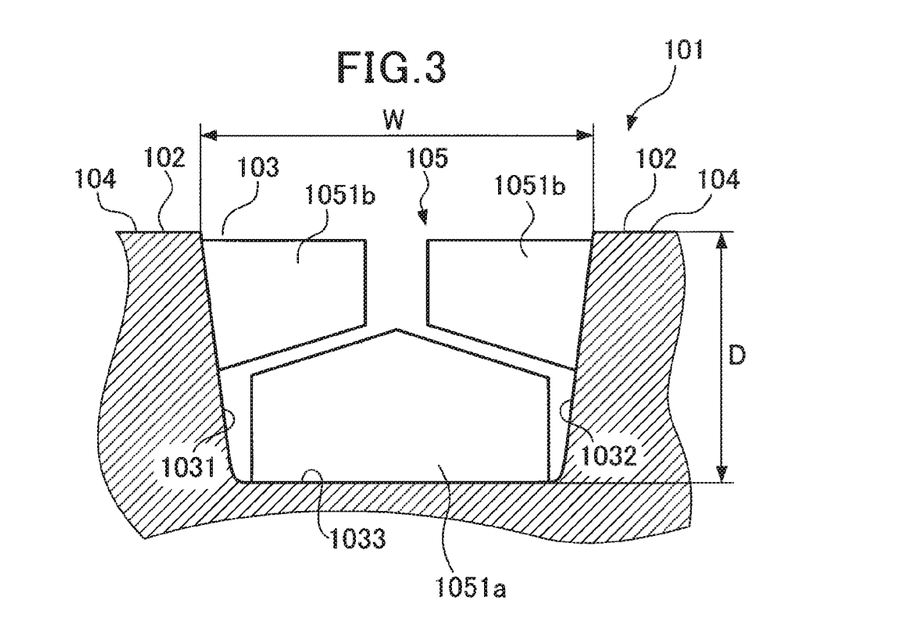
FIG. 3 is a schematic cross sectional view taken along line in FIG. 1.
Figure 4:
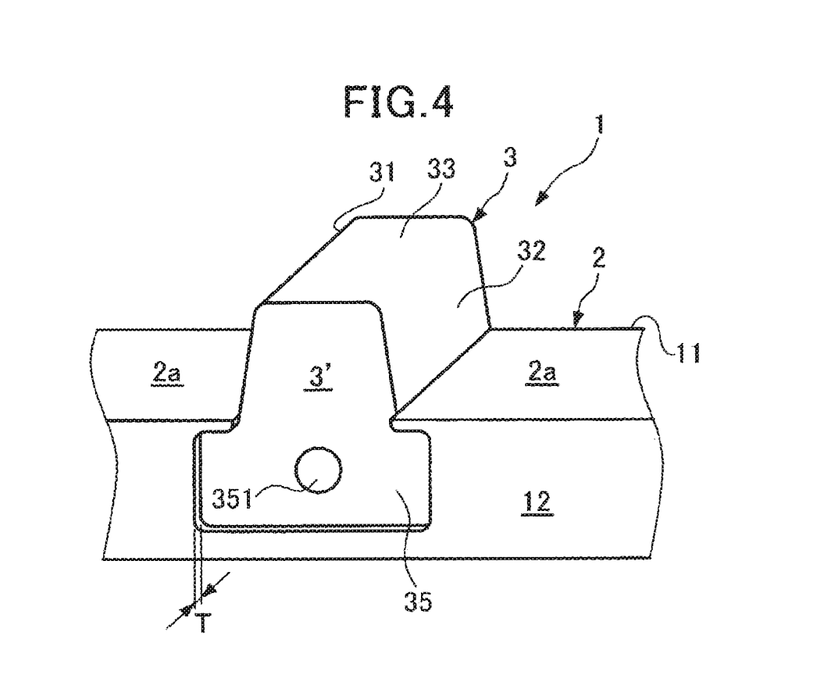
FIG. 4 is a schematic perspective view of a portion of the molding element without an insert according to first embodiment of the present disclosure.
Figure 5:
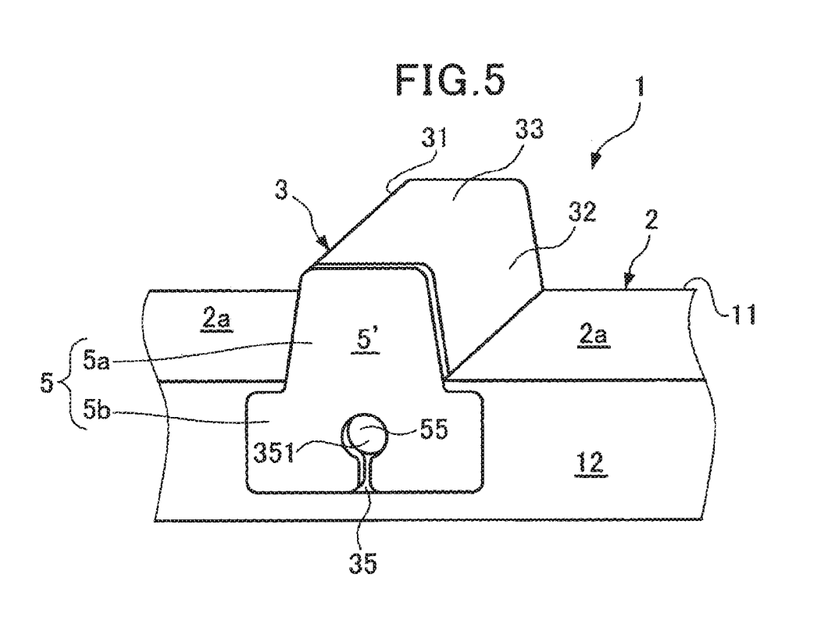
FIG. 5 is a schematic perspective view of a portion of the molding element with the insert according to first embodiment of the present disclosure.
Figure 6:
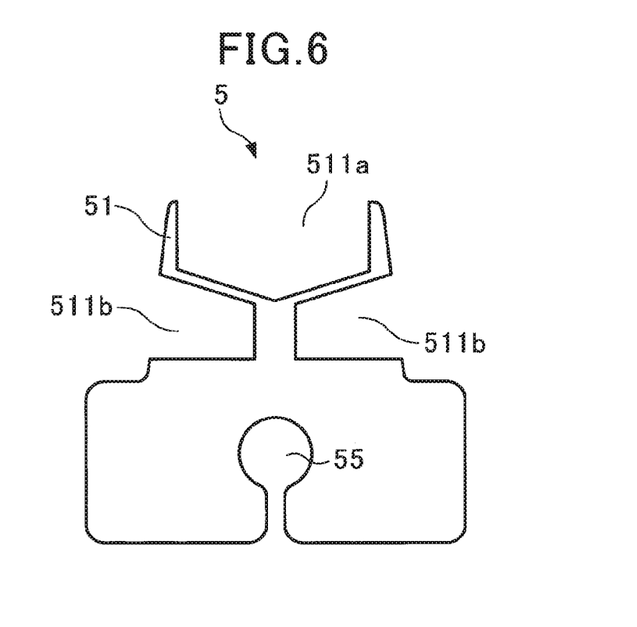
FIG. 6 is a schematic view of a notched plate according to first embodiment of the present disclosure.
Figure 7:
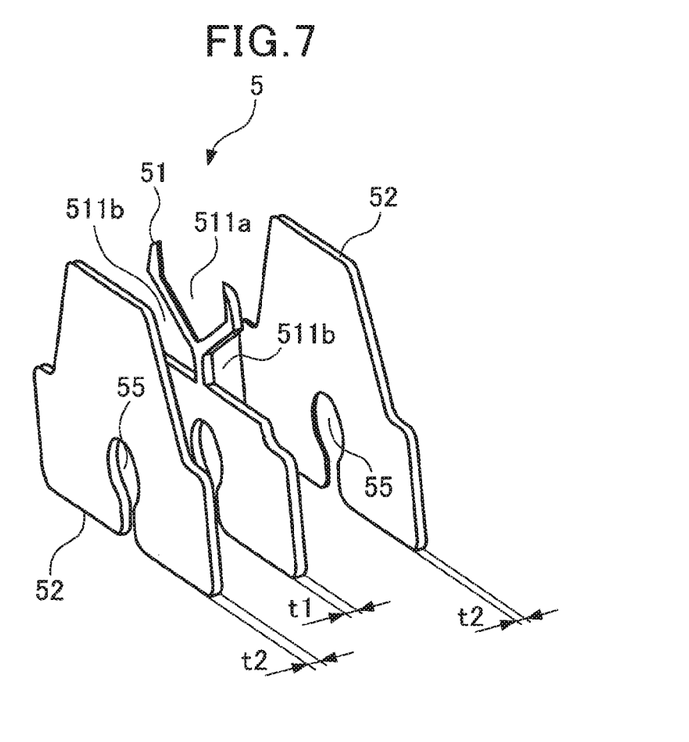
FIG. 7 is a exploded perspective view of the insert used in the first embodiment of the present disclosure.

FIG. 1 is a schematic plan view of a tread for a tire molded with a mold comprising a molding element according to a first embodiment of the present disclosure. FIG. 2 is an enlarged schematic plan view showing a portion indicated as II in FIG. 1. FIG. 3 is a schematic cross sectional view taken along line in FIG. 1. FIG. 4 is a schematic perspective view of a portion of the molding element without an insert according to the first embodiment of the present disclosure. FIG. 5 is a schematic perspective view of a portion of the molding element with the insert according to the first embodiment of the present disclosure. FIG. 6 is a schematic view of a notched plate according to the first embodiment of the present disclosure. FIG. 7 is an exploded perspective view of a configuration of the insert according to the first embodiment of the present disclosure.

The tread 101 is a tread for a tire having dimension 205/55R16 and comprises a contact face 102 intended to come into contact with the ground during rolling, a plurality of grooves 103 extending in a tire circumferential direction indicated as XX'. The groove 103 is delimited by two groove sidewalls 1031, 1032 facing each other and being connected by a groove bottom 1033. The groove 103 has a width W at a level of the contact face 102 and a depth D (as shown in FIG. 3).

As shown in FIG. 1, a contact patch 106 has a contact patch length L in a tire circumferential direction when the tire with the tread 101 is mounted onto its standard rim and inflated at its nominal pressure and its nominal load is applied. According to 'ETRTO Standard Manual 2016' the standard rim for this size is 6.5 J, the nominal pressure is 250 kPa and the nominal load is 615 kg.

As shown in FIG. 1, in the groove 103, a plurality of closing devices 105 is provided. The closing device 105 comprises one first flexible fence 1051a and two second flexible fences 1051b for dividing an air column created between the ground and the groove 103 in the contact patch 106 during rolling. Closing devices 105 are provided at a regular interval of distance P in the tire circumferential direction in the groove 103. The distance P is preferably shorter than the contact patch length L as to at least one closing device 105 in each groove 103 is always located in the contact patch 106 during rolling.

The first flexible fence 1051a has a thickness of t1 and extends from the groove bottom 1033 of the groove 103. Two second flexible fences 1051b has the thickness of t1 and extend from each of the opposite groove sidewalls 1031, 1032. All the first and the second flexible fences 1051a, 1051b are placed on the same plane.

The first and the second flexible fences 1051a, 1051b do not overlap each other in a circumferential direction (in sectional view of the groove 103). The first and the second flexible fences 1051a, 1051b cover at least equal to 70% of the cross sectional area of the groove 103, as shown in FIG. 3.

As shown in FIG. 3, the first flexible fence 1051a has a pentagon shape extending in radially outward direction of the tread 101 from the groove bottom 1033. The width of the first flexible fence 1051a is substantially equal to the width of the groove bottom 1033 at its bottom and the height of the first flexible fence 1051a is less than the depth D of the groove 103.

Further, a radially inner edge of the second flexible fence 1051b extends obliquely upwardly from the groove sidewall 1031, 1032 so as to extend substantially parallel to a radially outer edge of the first flexible fence 1051a. A radially outer edge of the second flexible fence 1051b extends substantially parallel to the contact face 102. The axial length (width) of the second flexible fence 1051b is less than the width W of the groove 103.

The tread 101 has the same structure as the conventional tread except for an arrangement regarding the closing device 105 and is intended to be applied to a conventional pneumatic radial tire and other non-pneumatic tire. Thus, description of the internal construction of the tread 101 will be omitted.

The groove 103 is provided with the plurality of closing device 105 each covering at least equal to 70% of the radial cross sectional area of the groove 103. Therefore, the length of the air column formed by the groove 103 in the contact patch 106 is shifted to a length whose groove resonance peak is outside of the frequency audible range for the human ear. Thus, groove resonance due to air column resonance of the groove 103 can be harmless.

The closing device 105 includes one first flexible fence 1051a and two second flexible fences 1051b and each of the second flexible fences 1051b extends from each of opposite groove sidewalls 1031, 1032. Therefore, it is possible to effectively cover as broader cross sectional area of the groove 103 as possible by the closing device 105, while maintaining good productivity of the tread 101 with the flexible fences as closing device 105, as the sectional area covered by each flexible fence can be reduced, and to have higher flexibility of an arrangement of the first and the second flexible fences 1051a, 1051b.

Next, a molding element 1 for a mold used for manufacturing the tread 101 will be described referring to FIGS. 4, 5, 6 and 7.

As shown in FIG. 4, the molding element 1 has a base portion 2 having a molding surface 2a intended to mold the contact face 102 of the contacting element 104. The base portion 2 has two side faces 11, 12 facing to circumferentially opposed directions. These side surfaces 11, 12 define circumferential extremities of the molding element 1.

In use, one side face 11 or 12 of one molding element 1 is contacted to the other side face 12 or 11 of the adjacent molding elements to form a mold.

As shown in FIG. 4, the molding element 1 also has a groove forming rib portion 3. The groove forming rib portion 3 has a trapezoid cross section and integrally extends from the molding surface 2a of the base portion 2 in a radially inward direction of the molding element 1.

The groove forming rib portion 3 includes two opposed rib side faces 31, 32 intended to mold two opposed groove side faces 1031, 1032, and a rib top face 33 intended to mold a bottom of the groove 1033. In case plurality of groove forming rib portions 3 is provided in one molding element 1, a radial position of the rib top face 33 can be the same among the these groove forming rib portions 3, or can be different among the these groove forming rib portions 3.

The circumferential length of the groove forming rib portion 3 is shorter than that of the base portion 2 by length T. As shown in FIG. 4, a circumferential end surface 3' of the groove forming rib portion 3 is placed at a position backwardly from the side face 12 of the base portion 2 by length T. Further, a rectangular area in the side face 12 below the groove forming rib portion 3 is backwardly offset from the side face 12 of the base portion 2 by length T so as to form a space 35, specifically a rectangular recessed space 35 having depth T.

The molding element 1 also comprises an insert 5 including an upper portion 5a having a trapezoid cross section identical to that of the groove forming rib portion 3 and a lower portion 5b having a rectangular cross section identical to that of the rectangular recessed space 35, as shown in FIG. 5.

The insert 5 is fixedly secured to the base portion 2 and the groove forming rib portion 3 such that the upper portion 5a abuts against the circumferential end surface 3' of the groove forming rib portion 3 and the lower portion 5b is received in the rectangular recessed space 35, as shown in FIG. 5.

Thickness of the insert 5 is the same as the above offset length T of the circumferential end surface 3' of the groove forming rib portion 3 and the depth T of the rectangular recessed space 35. Therefore, the surface 5' of the insert 5 is flush with the side face 12 of the base portion 2.

The insert 5 is fixed to the groove forming rib portion 3 by a fixing means such as a screw extending through a hole 351 in a groove forming rib portion 3 and a hole 55 in the insert 5.

The insert 5 may be fixed to the groove forming rib portion 3 by other manner such as welding, gluing, etc. In this case, the holes 55, 351 may not be provided.

The insert 5 can be placed at any part of the groove forming rib portion 3. In case, a space for receiving the insert 5 is provided at a position which is not facing to the side face 11, 12 of the molding element 1, the insert 5 can be placed so as to be disclosed in WO2010/146180A1, for example.

As shown in FIG. 7, the insert 5 includes one notched plate 51 and two support plates 52, 52 stacked on both sides of the notched plate 51 so as to sandwich the notched plate 51.

The notched plate 51 has thickness of t1 and each of the support plates 52 has thickness t2.

As shown in FIG. 6, the notched plate 51 includes a top notch 511a having a pentagon shape complementary to the first flexible fence 1051a so as to be open toward radially inward direction (that is, open to the rib top face 33 of the groove forming rib portion 3). In addition, the notched plate 51 includes two side notches 511b having a trapezoid shape complementary to the second flexible fence 1051b so as to be open toward axial direction (that is, open to the rib side face 31 or 32).

The top notch 511a is used to form the first flexible fence 1051a of the closing device 105, and the two side notches 511b are both used to form the second flexible fence 1051b of the closing device 105.

The notched plate 51a sandwiched by two support plate 52b has thickness t1 provided with one top notch 511a which opens to the rib top face 33 when fixed in the rectangular recessed space 35 of the groove forming rib portion 3, two side notches 511b that each open toward the opposed rib side faces 31, 32 when fixed in the rectangular recessed space 35 of the groove forming rib portion 3.

The thickness t1 of the notched plates 51 and the thickness t2 of all the support plates 52 are both at most equal to 2.0 mm. Thus, the thickness of the insert 5 in this embodiment is at most equal to 6.0 mm.

These thicknesses, the thickness t1 of the notched plate 51 and the thickness t2 of the support plate 52 are preferably at most equal to 0.8 mm, more preferably at most equal to 0.7 mm and still more preferably at least equal to 0.02 mm and at most equal to 0.6 mm.

The notched plate 51 and the support plates 52 are provided with a hole 55 for receiving fixing means, such as a screw. In case insert can be fixed to the groove forming rib portion 3 via means not requiring to have such the hole, the notched plate 51 and the support plates 52 of the insert 5 may not include any portions for receiving the fixing means, such as holes 55.

Any material able to resist to the force applied during vulcanization, for example metal, resin, plastic or composite material, is usable for configuring both the notched plate 51 and the support plate 52.

The notched plate 51 and the support plates 52 may be manufactured, for example, by cutting a steel sheet via a wire or via a laser.

The notched plate 51 and the support plates 52 may be covered completely or partly with a non-stick material for better and easier demolding. The non-stick material is, for example xylane.

Since the insert 5 comprises at least one notched plate 51 that is easier to form a shape necessary for forming a portion of the groove 103 of the tread 101 and the flexible fence 1051 of the closing device 105, processing duration for manufacturing such the insert 5 decreases resulting improvement on productivity of the molding element 1 for forming the tread 101 provided with the plurality of flexible fence 1051 of the closing device 105 in the groove 103.

Since a thickness of the notched plate 51 composing the insert 5 have narrow tolerance in thickness than other processes, it is possible to form the plurality of flexible fence 1051 of the closing device 105 with accurate thickness to permit required bending of the flexible fence 1051 of the closing device 105 for liquid drainage.

Since the insert 5 comprises at least one notched plate 51 of thickness t1 includes notches 511a, 511b for forming the flexible fence 1051 of the closing device 105, it is possible to increase degree of freedom to design and to position the flexible fence 1051 of the closing device 105.

Since the notched plate 51 includes three notches 511, one opening to the rib top face 33 and two other each opening to different rib side faces 31, 32, it is possible to manufacture a tread 101 provided with the flexible fences 1051 of the closing device 105 in the groove 103 one extending from the groove bottom 1033 and two other each extending from the two opposed groove sidewalls 1031, 1032 more accurate thickness to permit required bending of the flexible fence 1051 of the closing device 105 for liquid drainage while effectively covering as broader cross sectional area of the groove 103 as possible and maintaining good productivity of the tread 101 with the flexible fences 1051 as closing device 105, as the sectional area covered by each flexible fence 1051 can be reduced, and to have higher flexibility of an arrangement of the flexible fences 1051.

Since the thickness t1 of the notched plate 51 and the thickness t2 of the support plate 52 are both at most equal to 2.0 mm, it is possible to ensure satisfactory bending capability of the flexible fence 1051 of the closing device 105 with hydrodynamic pressure for liquid drainage as these thicknesses will substantially be equal to the thickness of the flexible fence 1051 of the closing device 105. These thicknesses, the thickness t1 of the notched plate 51 and the thickness t2 of the support plate 52 are preferably at most equal to 0.8 mm, more preferably at most equal to 0.7 mm and still more preferably at least equal to 0.02 mm and at most equal to 0.6 mm.

Since the insert 5 further comprises at least one support plate 52 of thickness t2 without any notch provided on one end of the insert 5 in a direction along which the groove forming rib portion 3 extends, it is possible to adjust easily the thickness of the insert 5 for compensating the thickness of the rectangular recessed space 35 while ensuring precise thickness of the flexible fence 1051 of the closing device 105.

Since two ends of the insert 5 in the direction groove forming rib portion 3 extend, are defined by the support plates 52, it is possible to easily adjust the thickness of the insert 5 for compensating the thickness of the rectangular recessed space 35 while ensuring precise thickness of the flexible fence 1051 of the closing device 105.

The insert 5 may be provided with multiple numbers of notched plates 51, and each the notched plate 51 may have the notch 511 opens different portion of the groove forming rib portion 3 when received in the rectangular recessed space 35. In such case, the support plate 52 may be provided between each the notched plate 51 in the same insert.

Figure 8:
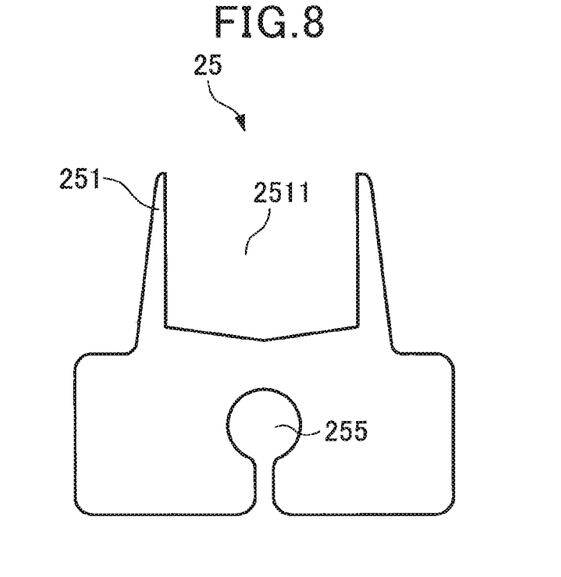
FIG. 8 is a schematic view of a notched plate according to second embodiment of the present disclosure.

A molding element according to a second embodiment of the present disclosure will be described referring to FIG. 8. FIG. 8 is a schematic view of a notched plate used in a molding element according to second embodiment of the present disclosure. The constitution of this second embodiment is similar to that of the first embodiment other than the arrangement shown in FIG. 8, thus description will be made referring to FIG. 8.

In the second embodiment, a notched plate 251 used in an insert 25 includes one relatively large notch 2511 opens to a rib top face 33 when the insert 25 is received in a rectangular recessed space 35 of a groove forming rib portion 3. The notch 2511 is used to form a flexible fence 1051 of a closing device 105 extending from a groove bottom 1033. The notched plate 251 is provided with a portion 255 to receiving a fixing means.

Since the notched plate 251 includes one notch 2511 opening to the rib top face 33, it is possible to manufacture a tread 101 provided with the flexible fence 1051 of the closing device 105 in the groove 103 extending from the groove bottom 1033 more accurate thickness to permit required bending of the flexible fence 1051 of the closing device 105 for liquid drainage.

Figure 9:
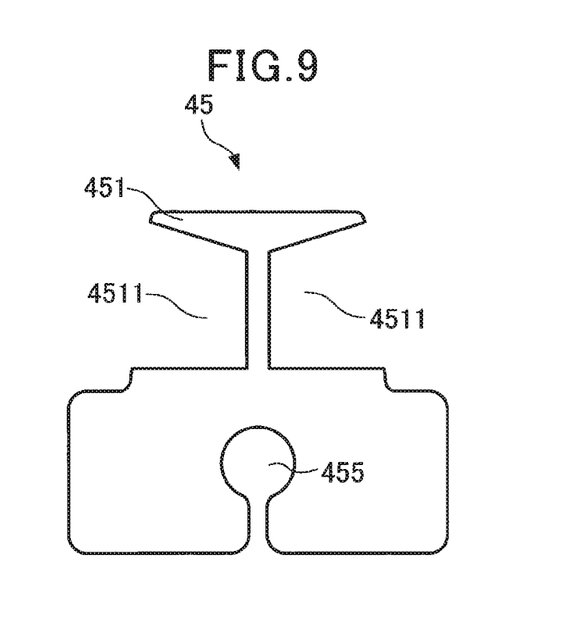
FIG. 9 is a schematic view of a notched plate according to third embodiment of the present disclosure.

A molding element according to a third embodiment of the present disclosure will be described referring to FIG. 9. FIG. 9 is a schematic view of a notched plate used in a molding element according to third embodiment of the present disclosure. The constitution of the third embodiment is similar to that of the first embodiment other than the arrangement shown in FIG. 9, thus description will be made referring to FIG. 9.

In the third embodiment, a notched plate 451 used in an insert 45 includes two notches 4511 each opens to different rib side faces 31, 32 when the insert 45 is received in the rectangular recessed space 35 of a groove forming rib portion 3. The notches 4511 are used to form flexible fences 1051 of a closing device 105 each extending from different groove sidewalls 1031, 1032. The notched plate 451 is provided with a hole 455 for receiving fixing means.

Since the notched plate 451 includes two notches 4511 each opening to different rib side faces 31, 32, it is possible to manufacture a tread 101 provided with the flexible fences 1051 of the closing device 105 in the groove 103 extending from the two opposed groove sidewalls 1031, 1032 more accurate thickness to permit required bending of the flexible fences 1051 of the closing device 105 for liquid drainage.

Figure 10:
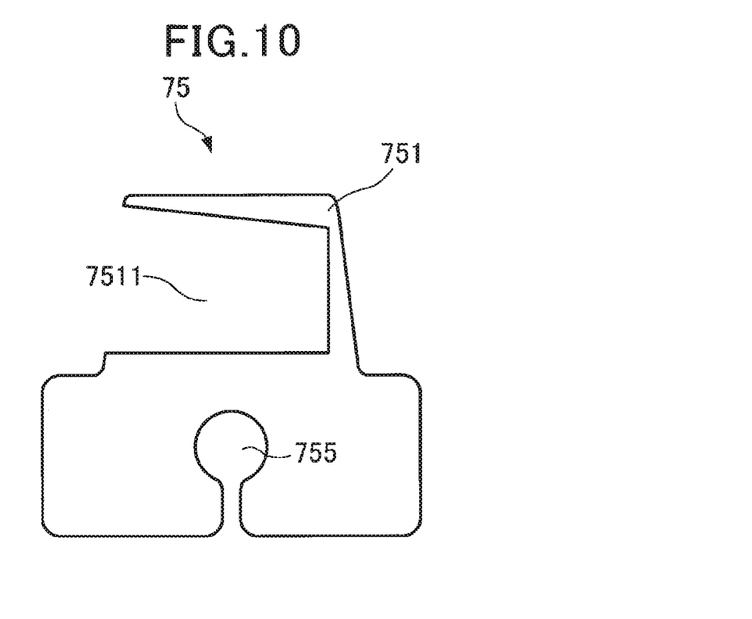
FIG. 10 is a schematic view of a notched plate according to fourth embodiment of the present disclosure.

A molding element according to a fourth embodiment of the present disclosure will be described referring to FIG. 10. FIG. 10 is a schematic view of a notched plate used in a molding element according to fourth embodiment of the present disclosure. The constitution of this fourth embodiment is similar to that of the first embodiment other than the arrangement shown in FIG. 10, thus description will be made referring to FIG. 10.

In the fourth embodiment, a notched plate 751 of an insert 75 includes one notch 7511 opening to one rib side face 31 (or 32) when the insert 75 is received in a rectangular recessed space 35 of a groove forming rib portion 3. The notch 7511 is used to form flexible fence 1051 of a closing device 105 extending from one of a groove sidewall 1031 (or 1032). The notched plate 751 is provided with a portion 755 to accept a fixing means.

Since the notched plate 751 includes one notch 7511 opening to one of the rib side face 31 (or 32), it is possible to manufacture a tread 101 provided with the flexible fence 1051 of the closing device 105 in the groove 103 extending from one of the opposed groove sidewall 1031 (or 1032) more accurate thickness to permit required bending of the flexible fence 1051 of the closing device 105 for liquid drainage.

The disclosure is not limited to the examples described and represented and various modifications can be made there without leaving its framework.

REFERENCE NUMERALS 1 molding element
11, 12 side face
2 base portion
2a molding surface
3 groove forming rib portion
31, 32 rib side face
33 rib top face
35 rectangular recessed space
351 hole
5 insert
51 notched plate
511 notch
52 support plate
55 hole
101 tread
102 contact face
103 groove
1031, 1032 groove side face
1033 groove bottom
104 contacting element
105 closing device
1051 flexible fence
106 contact patch

What is claimed is:

1. A molding element for a mold used for manufacturing a tread of a tire having a plurality of contacting element delimited by a plurality of grooves, the molding element having a molding surface for forming a contact face of the contacting elements intended to come into contact with ground during rolling and a groove forming rib portion for forming the groove comprising two opposed rib side faces for forming two opposed groove side faces and a rib top face connecting two rib side faces for forming a groove bottom, the groove forming rib portion providing a space opening to at least one of the rib side faces and/or to the rib top face and an insert received in the space for forming a portion of the groove and a closing device in the groove, wherein the insert comprises a plurality of separately formed plates, at least one of said plates being a notched plate of thickness t1, and the notched plate includes at least one notch extending through a full thickness of the notched plate for forming a flexible fence of the closing device, the flexible fence having approximately the thickness t1.

2. The molding element according to claim 1, wherein the notched plate includes at least one notch opening to the rib top face.

3. The molding element according to claim 1, wherein the notched plate includes at least one notch opening to at least one of the rib side faces.

4. The molding element according to claim 1, wherein the notched plate includes two notches each opening to different rib side faces, respectively.

5. The molding element according to claim 1, wherein the notched plate includes three notches, one opening to the rib top face and other two opening to different rib side faces, respectively.

6. The molding element according to claim 1, wherein the insert further comprises at least one support plate of thickness t2 without any notch placed adjacent to the notched plate.

7. The molding element according to claim 6, wherein the thickness t1 of the notched plate and the thickness t2 of the support plate are both at most equal to 2.0 mm.

8. The molding element according to claim 6, wherein the notched plate is placed between the support plates.

\* \* \* \* \*